United States Patent [19]
Lobel et al.

[11] Patent Number: 4,882,729
[45] Date of Patent: Nov. 21, 1989

[54] PAGING CONTROLLER HAVING A MULTIPLEX BUS ARRANGEMENT

[75] Inventors: Gary S. Lobel, Boynton Beach; Steven J. Goldberg, Coral Springs; Gerald H. Johnson, Jr., Boynton Beach, all of Fla.

[73] Assignee: Motorola, Inc., Schaumburg, Ill.

[21] Appl. No.: 225,423

[22] Filed: Aug. 7, 1988

[51] Int. Cl.⁴ .............................................. H04J 3/02
[52] U.S. Cl. .................................. 370/85.1; 370/100.1
[58] Field of Search ....................... 370/85, 89, 86, 95, 370/110.1; 340/825.5

[56] References Cited

U.S. PATENT DOCUMENTS

4,511,958  4/1985  Funk ...................................... 370/85
4,680,753  7/1987  Fulton et al. .......................... 370/85

Primary Examiner—Joseph A. Orsino
Assistant Examiner—Frank M. Scutch, III
Attorney, Agent, or Firm—William E. Zitelli; Vincent B. Ingrassia

[57] ABSTRACT

A paging controller for a paging communication system exchanges information by a global multiplexed bus arrangement. The bus arrangement permits voice, data and control information to be exchanged between a common memory and a plurality of I/O modules in a common communication bus. The timing signals of the bus arrangement including the I/O modules are synchronized to expeditiously exchange information among the modules. In operation, each module has a preassigned address representative of a sequence number in a predetermined succession order to permit each module to access the bus.

11 Claims, 6 Drawing Sheets

PAGING CONTROLLER HAVING A MULTIPLEX BUS ARRANGEMENT

BACKGROUND OF THE INVENTION

1. Field of the Invention

The present invention relates to paging systems in general and in particular, to a paging controller used for encoding paging information into coded signals for transmission over a radio frequency link to a paging receiver.

2. Background Discussion

Paging receivers (pagers) are generally small, portable, battery-operated radio receivers designed to be carried on an individual. The communication technique used in paging systems is referred to as selective calling in which transmissions intended for a particular receiver will cause a response only in that receiver. Pager communication systems are well known in the art and operate with many types of coding schemes including single or multi-tone signals, selected combination of tone and voice signals, and digitally encoded signals. Typically, there are wide area paging communication systems capable of transmitting throughout a metropolitan area and local paging communication systems which transmit in a much smaller service area as, for example, a specific building complex or other facility. Wide area paging systems typically have a number of remote transmitting stations to cover a large area, while local paging systems typically have only one transmitting station. The range of operation of the various systems is generally determined by the power of the transmitter used.

Figure 1:
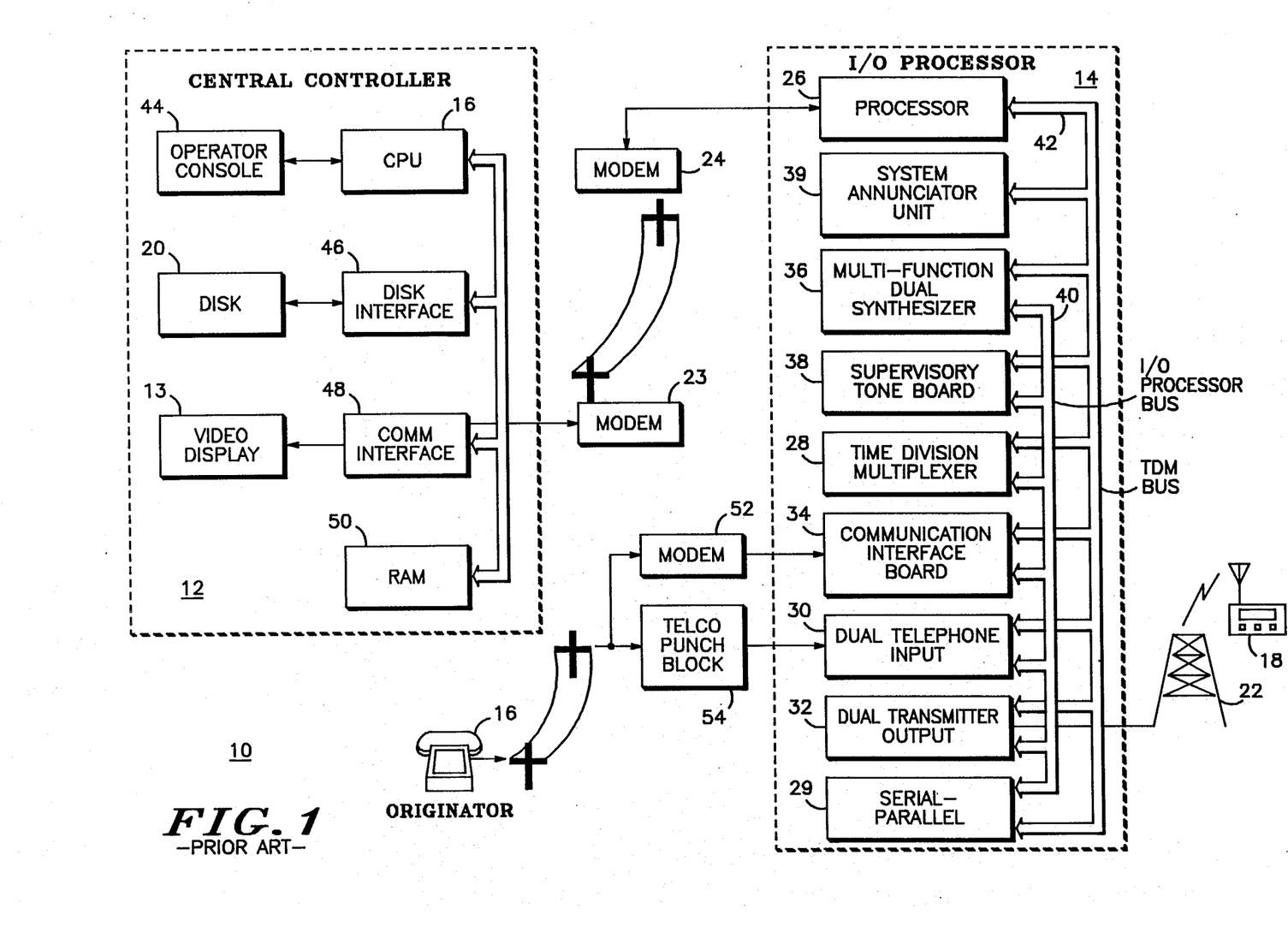
FIG. 1, is a prior art I/O processor for a wide area paging communication system.

To clearly understand the present invention, it is necessary to briefly explain the operation of a typical wide area paging communication system. FIG. 1 illustrates a typical wide area paging communication system 10 having a central controller 12 and a remote input/output (I/O) processor 14. System 10 is used for transmitting information from an originator to a person carrying a portable paging receiver 18 throughout a large metropolitan area. An example of such a paging system is a METRO-PAGE 200 terminal manufactured by Motorola, Inc. This paging system can handle up to 200,000 pagers having combinations of tone, voice, numeric, or alphanumeric paging.

In the operation of such a system, an originator 16 desiring to send information to a local paging receiver user, enters a pager identification number in an entry device and begins communication with the local I/O processor 14. The entry device, such as telephone 16, is used to access the data base in the central controller 12 to enter a paging receiver's identification number and messages intended therefor for subsequent transmission to the selected receiver. The telephone 16, is useful for entering voice or numeric data whereas a video display terminal, such as video display terminal 13, is useful for entering alphanumeric messages and for accessing and updating information in the central controller 12. A mass storage media, such as disk 20, provides a subscriber list of all the paging receiver ID's that are valid in the system 10. Filed under each pager ID in the subscriber list are several items that are needed by the central controller 12 to send or transmit a page including information, such as pager type, the particular pager address which corresponds to the pager ID, the maximum message storage time, how often delivery attempts are to be made, and additional statistical information useful in a feasible commercial operation of the system 10.

In a wide area paging system, it is cost effective to have a plurality of geographical remote transmission sites and to locate the telephone inputs (for local calls) and transmitter control units at the remote site in a single device referred to as the I/O processor 14. The I/O processor 14 substantially reduces toll charges between the central controller 12 and the remote areas. This reduction in line cost typically means the difference between cost effective paging service at the remote site and providing no paging service at all.

In a wide area paging service, with the I/O processor 14 remotely located from the central controller 12, page requests can be processed in a number of ways. First, a tone alert page can be initiated by telephone input 16, processed by the I/O processor 14 using information received over communication link 24 from central controller 12, and transmitted over a transmitter output unit 22. Second, a tone and numeric page can be initiated by telephone input 16, processed by the I/O processor 14 using information from the central controller 12, and transmitted over transmitter 22. Third, tone and voice pages can be initiated by telephone 16 and subsequently transmitted over transmitter 22. Finally, alphanumeric information entered through an entry device, such as video display terminal 13 can be transmitted via communication link 24 to input/output processor 14 to be transmitted via transmitter 22. Thus, the central controller 12 directs the action in the remote I/O processor 14 with the I/O processor 14 controlling the telephone input and transmitter output.

Heretofore, an I/O processor 14 of this type (such as one included in a METRO-PAGE 200) has consisted of a 15-slot card rack power supply, processor board 26, time division multiplexer (TDM) switchboard 28, and serial to parallel board 29. Remaining slots have been filled by a combination of telephone input boards 30, transmitter output boards 32, communication boards 34, synthesizer boards 36, and a supervisory tone board 38. The TDM switchboard has enabled the transfer of digitized voice and tone information among the specialized boards. The serial to parallel board 29 has permitted the exchange of information between an I/O processor bus 42 and a TDM bus 40.

The dual telephone input board 30 has been able to interface with up to two telephone inputs. The dual transmitter output board has the capability to interface with up to two independent transmitters. The communication board has provided data input from a communication modem or the like. The multifunctional dual synthesizer has provided support for the radio frequency of the dual transmitter output board.

The supervisory tone board has provided continuously-variable sloped delta modulation idle patterns and a dual tone multifrequency control tone required by the other boards to insure proper operation of the I/O processor 14. In addition to generating tones, another function of the supervisory tone board has been to continuously monitor the activity status of all tones and to provide an activity alarm interrupt at the system annunciator unit 39 if a tone fails. Basically, the supervisory tone board has been used to generate audio tones that are used for signalling the originator. For example, the supervisory tone board has been equipped with voice messages to lead the originator through the steps of making a call to a paging receiver user. The multifunctional dual synthesizer has been used to convert the paging receiver ID and page information into one of several signalling formats, such as GSC, 5/6 tone, POCSAG, etc.

Furthermore, to enable the transfer of digitized voice and tone information within the I/O processor 14, a time division multiplex (TDM) bus structure 40 has been utilized. The digitized audio or TDM bus 40 has provided serial digitized audio data between the various boards of the I/O processor 14. The transfer of serial data on the TDM bus is controlled by the TDM switchboard. To communicate effectively with each board, however, the processor 26 has required an additional processor bus 42 for data and to control the functions of the individual boards. The processor bus has been a parallel bus architecture for expediting the exchange of information. Basically, the processor bus 42 has provided data and control information from the processor to each individual board while digitized audio data in the form of voice and tone information has been transferred between the boards on the TDM bus. To effect the exchange between the serial TDM bus 40 and the parallel processor bus 42, a serial to parallel board 29 is used.

While such a configuration has worked well to provide transfer of a large amount of data between the boards, such a system has been very costly due to the amount of hardware necessary for each board to interface with the TDM bus and processor bus separately. It would thus be highly desirable and very cost effective to eliminate the dual bus structure of the I/O processor and reduce the number of the boards required to provide the functions of the I/O processor in operation. It should be appreciated that any hardware and software reduction in the I/O processor is a substantial factor in achieving marketability success and consumer acceptance of the present invention.

SUMMARY OF THE INVENTION

It is thus an object of the present invention to overcome the disadvantages of previous I/O processors by providing a paging controller having a multiplexed bus construction which is capable of handling alphanumeric paging information and digitized audio in the form of voice and tone information.

It is another object of the present invention to provide a paging controller having a shared memory resource and a plurality of input/output modules capable of interfacing with telephone inputs, modem inputs, and transmitter outputs.

Another advantage of the present invention is a paging controller that reduces the hardware and software necessary for operation by synchronizing to incoming digitized audio voice information the timing of the shared global communication bus.

In general, the present invention comprises a method and apparatus for exchanging information within an I/O processor of a paging communication system. A multiplex bus arrangement provides voice, data and control information to be communicated between a shared memory and a plurality of I/O modules. The bus arrangement includes a communication bus, the common memory, a system timing unit, and the plurality of I/O modules. The communication bus is the medium for exchanging information between the memory and the I/O modules. The system timing unit generates a synchronization signal on the bus. Each module, being responsive to the synchronization signal, establishes a unique time period during which each module is selectively coupled to the bus and given access to the memory for exchanging information.

In particular, each module is capable of receiving serial data from telephonic inputs and transmitting serial data to a transmitter. Each module synchronizes the circuitry on the module to the synchronization signal so that the receiving rate of the input data meshes with the communication bus rate for optimizing the throughput and for eliminating the necessity of a separate serial bus.

DESCRIPTION OF A PREFERRED EMBODIMENT

Figure 2:
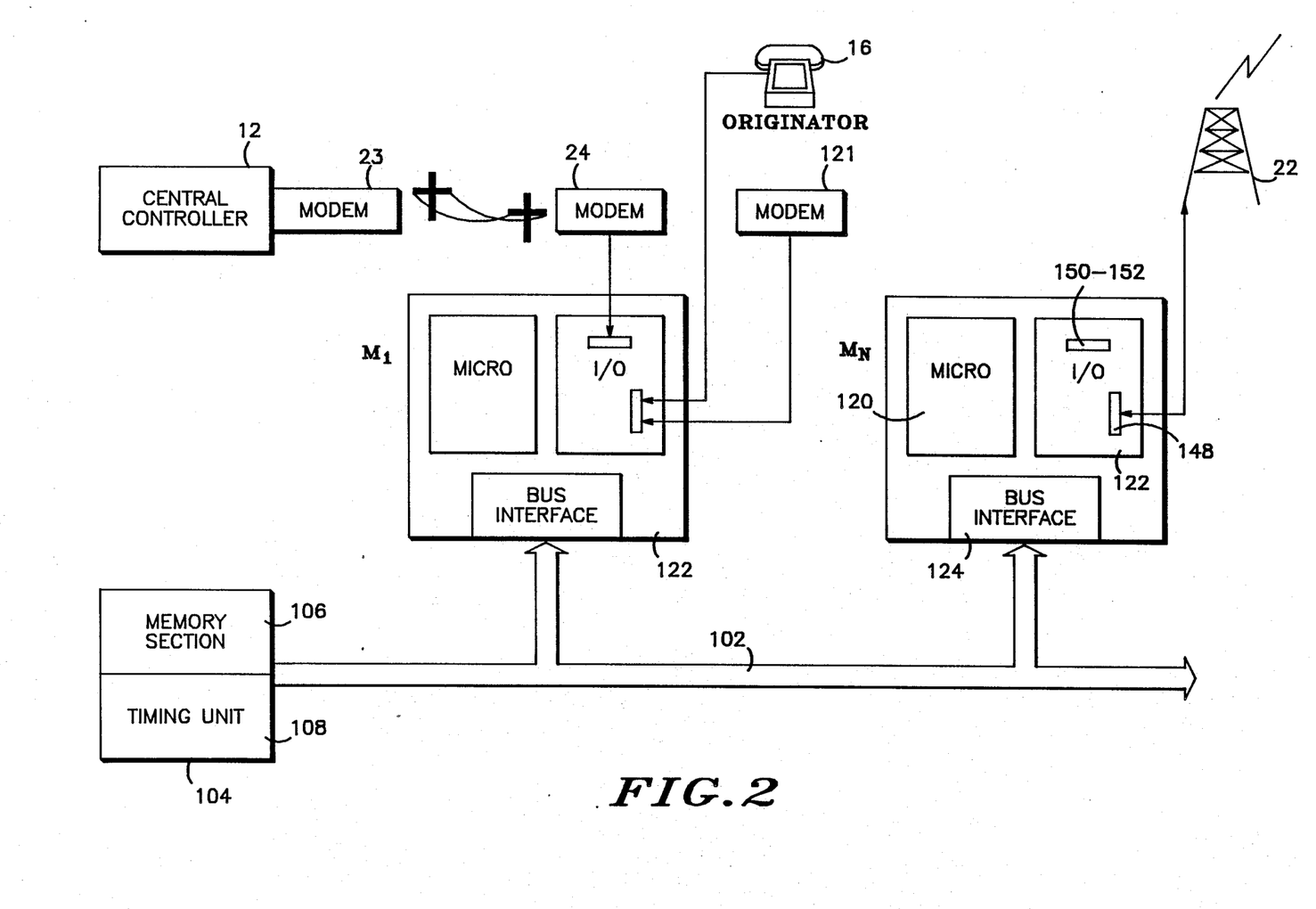
FIG. 2 is a schematic block diagram of the multiplex bus arrangement of the present invention.

In general, FIG. 2 illustrates a schematic form for a paging controller 100 in accordance with the present invention. The paging controller includes a multiplex bus arrangement having a common communication bus 102 interconnecting a plurality of modules $M_1$, $M_2$, ... $M_{N-1}$, $M_N$, connected thereto. The communication bus 102 is further connected to a shared resource management unit 104. The shared resource management unit 104 includes a shared memory means 106 and a system wide timing unit 108. The communication bus exchanges voice, data and control information among the modules. The paging controller 100 illustrated in FIG. 2 is a distributed global bus type and is suitable for application in a paging system configuration as illustrated in FIG. 1.

While it is understood that a plurality of modules $M_1$ ... $M_N$ may be connected to bus 102, a local area paging system for addressing less than 1,000 paging receivers in one locale may employ only one module M and one resource management unit 104. In this paging controller configuration, the data base for the subscriber list is included totally within memory 106. In the local area paging system (<1,000 paging receivers), the paging controller of the present invention replaces the combination of the central controller 12 and I/O processor 14.

To address up to 100,000 paging receivers over a greater area, a number of paging controllers each having a number of modules $M_1$ ... $M_N$ may be employed. In a wide area paging system of this type, a plurality of remote paging controllers can be coupled to the central controller. In this configuration, the paging controller 100 replaces the function of the I/O processor 14 illustrated in FIG. 1.

As can be appreciated, the elimination of the separate internal TDM bus of FIG. 1 and the subsequent reduction in hardware is a substantial factor in achieving consumer acceptance. Specifically, the elimination of the TDM bus, TDM switchboard, serial parallel board, and the supervisory tone board substantially reduces the cost of the paging controller.

Continuing the discussion with reference to module $M_N$, where $M_N$ is a typical module in the paging controller 100, module $M_N$ includes an I/O management section 122 having a plurality of input ports 150-152 and at least one telephone port 148. The telephone port 148 can be used either for input or output. If operating as an input port, the telephone port 148 is connected to a telephone network, accepting incoming page requests. When the telephone port 148 is an output port, the input ports 150 can receive control voice and data information to be used for processing paging information to be transmitted to a selected paging receiver. The input ports include a serial port 150 and a parallel port 152. The telephone port 148 provides communications with a telephone company line or modem, depending upon the particular type of data to be received. The serial port 150 provides communications with a CRT console, central controller, disk, etc. and the parallel port 152 serves as a microprocessor control port for on board hardware. When the telephone port 148 is an output mode, the telephone port 148 is typically connected to a transmitter to transmit paging information to one of a plurality of paging receivers.

Each module is provided with active processing capability by interfacing a microprocessor unit 120 having a corresponding memory and bus system. The operation of the microprocessor effects one or more input/output actions in accordance with a predetermined process control program stored in the microprocessor. In addition to the microprocessor unit 120 and the I/O management section 122, a bus interface 124 is provided to communicate with bus 102.

In the wide area implementation of the present invention, the paging controller replaces and performs the same functions as the I/O processor 14 as shown in FIG. 1. In this configuration, one module, such as $M_1$, is used to provide communications to the central controller and to receive communications from the local area. A second module, such as $M_N$, provides communication with the local transmitter 22 for transmitting paging information. The central controller communication is typically a transmission link such as provided by modems 24 to transfer the data base (subscriber list) from the central controller to the remote local area paging controller. The local area communications includes local telephone inputs 16 and data inputs such as modem 121.

In local or wide area operation, each module, such as $M_N$, takes turns in having access and control over the communication bus 102 and when a module has supervisory control over the communication bus, it is referred to as a master of the communication bus 102. Associated with each module is an address being numbered in sequence to define a succession order and each module takes turns in being master of the communication bus 102 in accordance with its sequence in its succession order. When a module is master of the communication bus, it may exchange data with the shared resource management unit 104. When the module is not a master, it is not permitted access or control over the communication bus. However, it is important to note that when a module is not a master, the module may continue to receive information through its respective input ports and to output information through its respective output ports.

Turning now to a discussion of the shared resource unit 104, the shared resource unit includes a memory means 106 for storing information received from a module and a system wide timing unit 108 to generate a synchronization signal to notify the modules when they may access communication bus 102. Access by a master is accomplished by sensing the synchronization signal and then determining the time period that the master has accessed to the bus, depending upon the predetermined address which has been assigned to the module. Additionally, the system timing unit generates a timing signal for the bus. The timing signal of the bus generates the necessary signals for effecting a transfer of information on the bus in a manner well known in the art.

The access of the system wide memory by individual modules is performed on a time division multiplex basis. Each module is assigned a specific time slot of a frame to access the memory. A frame is equivalent to the total time of all time slots. The total number of time slots is equivalent to the number of modules that can be connected to the bus. A benefit of using time slots rather than the more typical bus request, bus grant structure of direct memory access system, is the reduction of hardware required on a module basis. Time slots also eliminate the time delay associated with a daisy chain and/or arbitrary bus accesses. It is important to note that each module becomes master of the common communication bus during its time slot and even if there are less modules than time slots, each module only accesses the communication bus during its time slot. That is, if vacant time slots are available, these time slots are not used by any of the modules present in the system. These allow additional modules to be connected to the bus without interfering with the operation of modules already connected.

To recapitulate, in a typical configuration for a local area paging system, one module ($M_1$) receives telephonic inputs from either local subscribers or the central controller. The paging requests are identified and correlated with a pager ID in the database included in resource means 104. The paging requests are codified into a paging signal which are transferred to module $M_N$ for transmission to the identified paging receiver through transmitter 22.

Figure 3A:
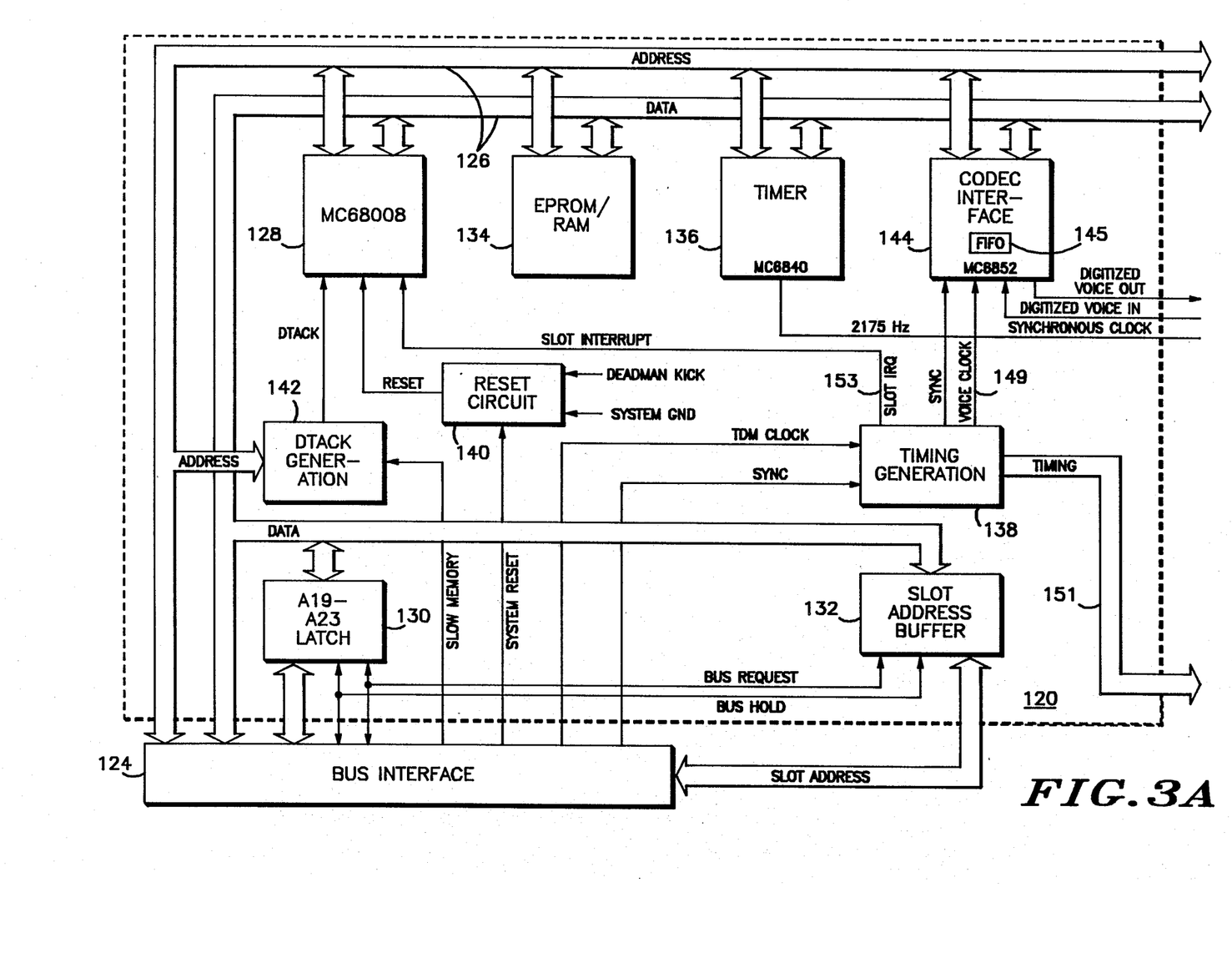
FIG. 3 is a detailed block diagram of an I/O module of the present invention.
Figure 3B:
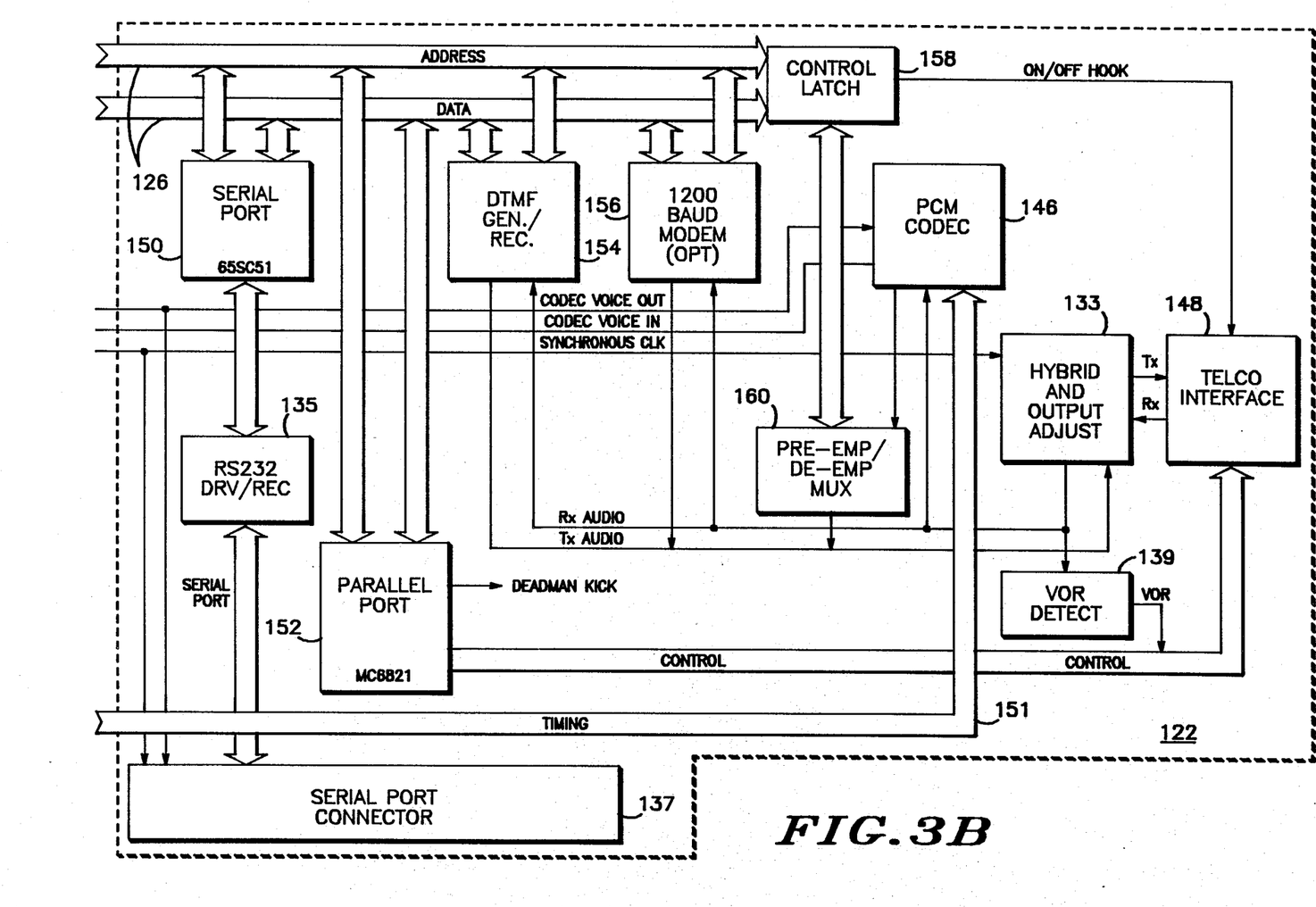

The architecture of an exemplary module $M_N$ is shown in FIG. 3 and includes the microprocessor controller unit 120, the input/output management section 122, the bus interface 124, and a module common bus 126. The module common bus 126 provides addressing, control, and information transfer between the various units and devices which constitute the module in a manner well known to those of ordinary skill in the art.

The microprocessor controller unit 120 includes a microcomputer 128, such as an MC68008 manufactured by Motorola, Inc. Microcomputer 128 exchanges information with communication bus 102 via bus interface 124 and bus control latches 130, bus interface 124 being connected to communication bus 102. The slot address of the module is contained in a slot address buffer unit 132. The slot address buffer 132 provides the slot address for the module. An electrical programmable read only memory 134, such as an I27256 manufactured by Intel, containing a resident firmware program for the microcomputer 128 and a random access memory (RAM) 134, such as a TC55257 manufactured by Toshiba, are provided to permit the microcomputer to effect its communication function as described more fully below. A timing unit 136, such as an MC6840 manufactured by Motorola, provides timing purposes for the software operation and also generates guard tone for remote transmitter applications. Further included in the microprocessor controller section 120 is a timing generation device 138 which is used to detect the synchronization signal for determining when the module has access to the bus 102. The timing generation device 138 also generates the sampling rate for a PCM codec 146 in the I/O management section 122.

A reset circuit 140 provides assurance of the microcomputer's operation. Essentially, the firmware contained in the EPROM must activate the reset circuit at predetermined intervals If the microcomputer fails to reset the reset circuit after the predetermined time, the reset circuit generates a reset signal to reset the microcomputer 128. A dtack generation device 142 provides external timing generation for the microcomputer needed for read and write cycles for a slow memory device.

A codec interface unit 144, such as an MC6852 manufactured by Motorola, interfaces with a pulse code modulation (PCM) codec, such as an MC145505 manufactured by Motorola, included in the I/O management unit 122. The PCM codec digitizes analog voice signals received over the telephone input port. The interface unit 144 controls receiving the digitized voice from the PCM codec 146 or transmitting the stored digitized voice to the PCM codec 146. Briefly, the PCM codec 146 receives an analog voice signal over a telephone line and digitizes the voice signal. The digitized voice is transferred to the codec interface unit 144, temporarily stored in a FIFO (first in-first out) buffer 145, and then fed to the microprocessor controller system 120 for storage in RAM 134. The FIFO buffer 145 is capable of temporarily storing data from the PCM codec digitized during an entire time slot (typically 4 bytes). On output from the microprocessor controller system to the transmitter, digitized voice data are read from the RAM through the codec interface unit 144 to the PCM codec 146. The PCM codec converts the digitized voice to an analog voice signal which is applied to a transmitter connected to the telco interface 148.

The codec interface unit 144 also receives a timing signal on line 149 being synchronized with the synchronization signal from the system wide timing unit 108. Additionally, the PCM codec 146 also receives a synchronized sampling signal on line 151 from the timing generator 138. Further, the slot interrupt on line 153 fed to the microprocessor is also synchronized to the synchronization signal. Since the codec interface, PCM codec, and microprocessor are synchronized to the same synchronization signal, digitized voice data can be efficiently and expeditiously exchanged between the I/O management unit and the microprocessor control system. For a better understanding of the configuration and functional cooperation of the components described briefly above, attention is directed to FIG. 5 of the drawings, wherein the respective timing signals are illustrated in detail.

The bus interface circuitry 124 enables the module to communicate via the communication bus 102 to the shared resource unit 104. Each module accesses the bus only during its designated time slot as determined by the address stored in the slot address buffer 132. The bus interface 124 decodes the module's position in the system and provides this information to the timing generator to enable the timing generator device 138 to generate an interrupt to the microcomputer when its time slot has arrived. In response to the interrupt, the microcomputer permits bus access after a predetermined time after the interrupt generation. The predetermined time is defined as the minimum time the fastest software routine in the microcomputer takes to its first bus access. Applicants have determined that approximately 250 us. appears to be the best waiting time.

During the time a module is a master of the bus, the module can transmit data in a burst to the shared resource means. Since the communication bus transfer rate is faster than the PCM codec digitization rate, PCM codec digitized data can be exchanged over the communication bus faster than it can be digitized. This factor plus the synchronization of the module units to one timing signal permit the digitized voice data to be transmitted over the same bus as control and other information data, thus negating the use of a second digitized audio (TDM) bus. It should be appreciated that the hardware reduction affected by the single bus design is a substantial factor in achieving success in accordance with this invention.

The I/O management section 122 includes the serial port 150, the parallel port 152, a DTMF generator 154, a modem 156, a control latch, the PCM codec 146, and telco interface port 148. The serial port is used to connect the module to a CRT or printer. The CRT can be used to communicate with microprocessor 128 or to access the database in the resource management unit. The parallel port 152 is used by the microprocessor 128 to control the telco interface and other units of the module. The DTMF generator generates the appropriate telephone exchange tones necessary for telephonic communication. The modem 156 permits remote communications with the module from the central controller or other computer systems. The PCM codec 146 provides analog to digital conversion and digital to analog conversion information as described before.

Paging tones and voice sometimes have to be adjusted in a frequency domain to compensate for the response of other electronic apparatus of the paging system. A software controlled pre-emphasis and de-emphasis circuit 160 accomplishes this task. Pre-emphasis is used for voice to compensate for de-emphasis introduced on the telephone company lines, over the air and in the pager. Additionally, deemphasis serves to make the voice signal more intelligible. When selected by the microcomputer 128, pre-emphasis is set at 6 db per octave. De-emphasis is also used to compensate when pre-emphasis is performed at the transmitter, although the voice may need to be pre-emphasized, paging tones are sent flat. The de-emphasis circuit compensates for the pre-emphasis in the transmitter under control of the microcomputer.

The telco interface port 148 provides an interface for receiving voice information and transmitting paging signals to the transmitter. The telco interface configuration is set up by switches and can be used to conform to typical telephone line types. The microcomputer 128 can read the switches through the parallel port 152.

Figure 4:
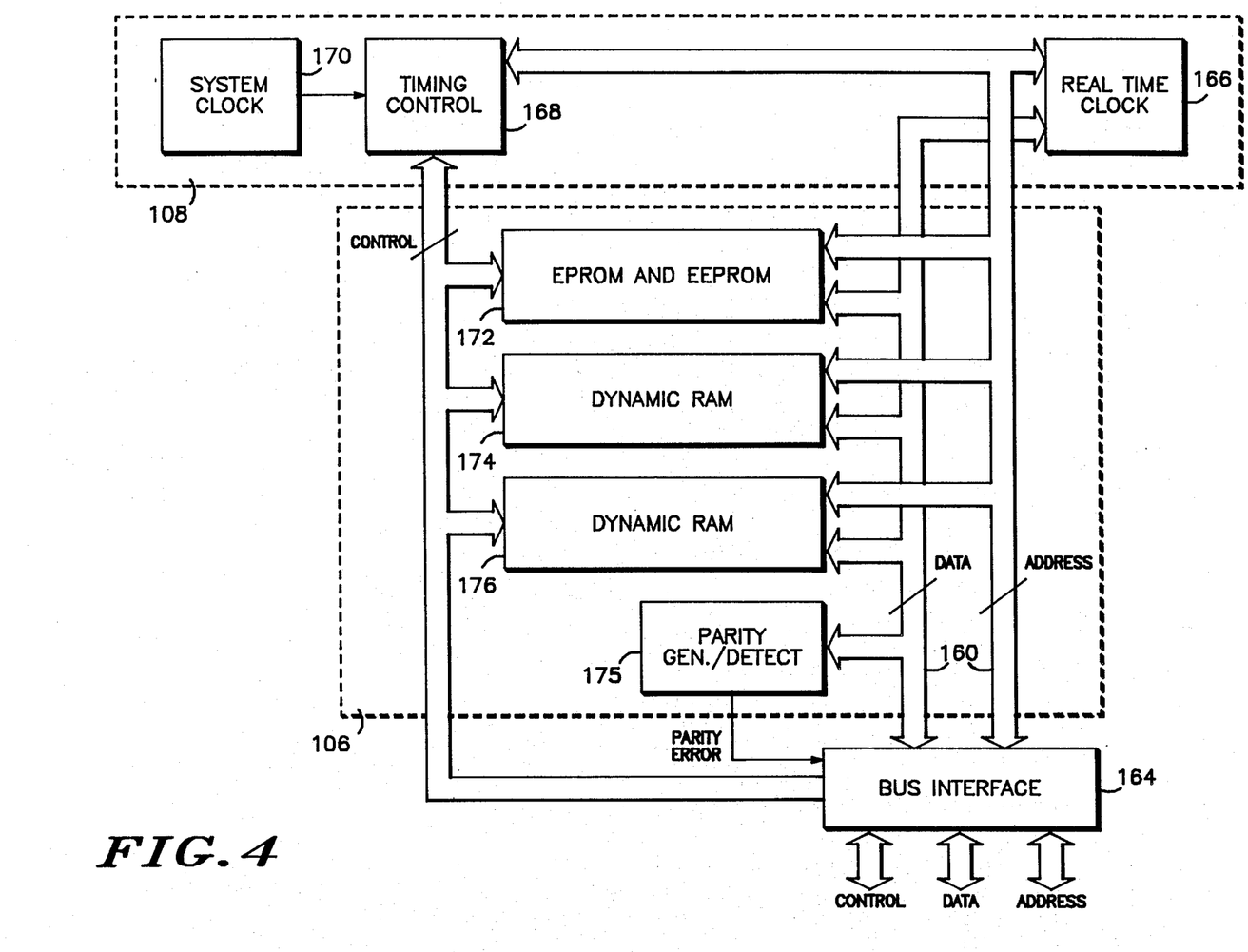
FIG. 4 is a detailed block diagram of the common memory unit and the system wide timing unit.

Referring now to FIG. 4, there is shown a detailed diagram of the shared resource unit 104. The shared resource unit 104 includes a system wide timing unit (system clock) 108 and a memory means 106. The memory means 106 and system timing unit 108 are connected by a local data and address bus 160 to a bus interface 164 which is connected to the communication bus 102. The system timing unit 108 includes a real time clock 166 for generating time of day information. Additionally, a timing control unit 168 includes the necessary hardware and circuitry for generating a synchronization signal through bus interface 164 onto communication bus 102.

An oscillator 170 provides the necessary clock signals to operate timing control circuitry 168. Additionally, on the shared resource unit 104 is memory means 106. Memory means communicates through data and address bus 160 via bus interface 164 to communication bus 102. Memory means 106 includes EPROM and EEPROM memory 172, RAM memories 174 and 176. The memory means can be used to support a database for up to 4,000 pager users, system voice prompts and up to 250 seconds of voice storage in 2 megabytes.

In operation, each module, when a master, has access to shared resource unit 104. Each master can store or retrieve data from the memory means 106. For example, a module connected to the central controller can load the memory means 106 with a subscriber list from the central controller for the local area. Another module serving the local area telephone inputs can receive data, correlate to the database in the memory means and transmit it to a second module. The second module can transmit the data via a local transmitter to the selected pager.

Figure 5A:
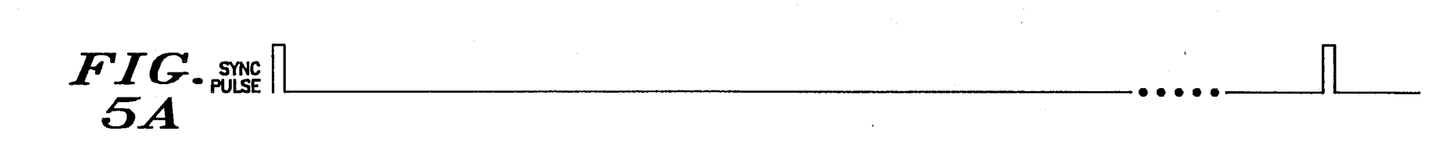
FIGS. 5A-G are timing diagrams which are useful in illustrating the exchange of information between a module and the common memory unit over the communication bus.

Turning now to FIGS. 5A–G, FIGS. 5A–G are useful in illustrating the exchange of information in which digitized voice information is transferred between a module over the communication bus to the memory means. The synchronization signal shown as FIG. 5A is generated by the system clock and provides a synchronization signal for each module. The synchronization signal notifies each module of its slot assignment. For example, if the sync pulse of the synchronization signal is taken to occur at slot 0, each module may determine its access to the bus by detecting the sync pulse and then starting a clock preloaded with the module's slot address. This insures each module has the opportunity of being master.

Figure 5B:
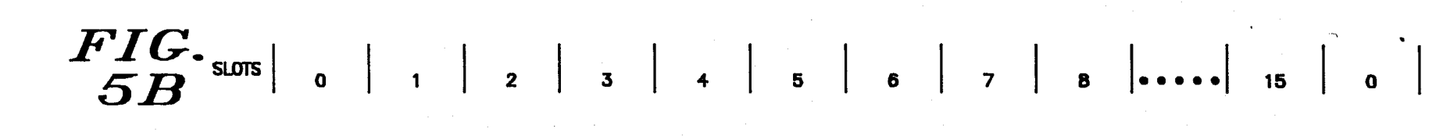

FIG. 5B illustrates in this example 15 slots which are available for the modules to exchange information with the memory means. It is noted that address slot 0 may be dedicated to the memory means to allow a refresh of the memory included in the memory means. As can be appreciated, each module will be a master during one of the slot times.

Figure 5C:
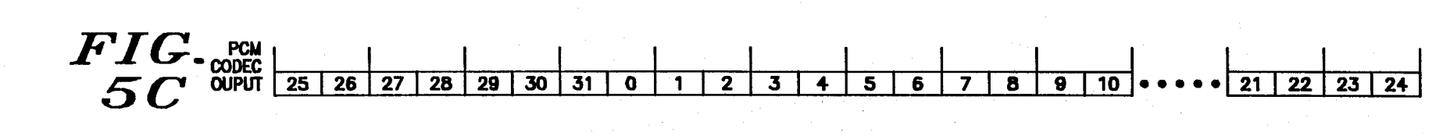

FIG. 5C illustrates exemplary digitizing of an incoming analog voice signal with the PCM codec. During each slot, two bytes of data can be digitized and sent to the codec interface unit. The two bytes of data are stored in the FIFO buffer in the codec interface for later retrieval by the microprocessor. It should be appreciated that since the PCM codec and codec interface receive timing signals from the timing generator, the slot interrupt and PCM codec output are "synchronized." In other words, the digitized data from the PCM codec will be synchronized to the transfer rate of the communication bus. In the illustrated example, 32 bytes of data are generated in one frame.

Figure 5D:
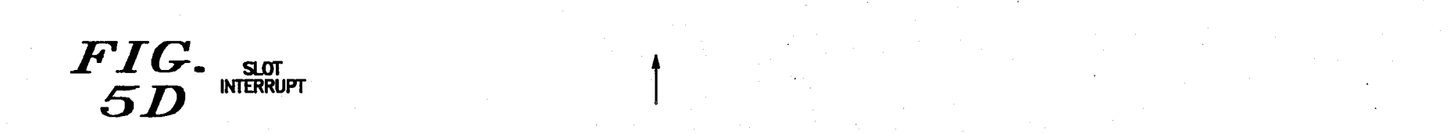

FIG. 5D illustrates the slot interrupt signal which is generated by timing generation means 138 of FIG. 3. The slot interrupt notifies the microprocessor when its slot occurs. A hardware circuit enclosed in the timing generation unit is incorporated to count the number of slots from sync before generating the slot interrupt. The slot number of the board is read from the backplane by 5 lines which are individually connected to GND or 5 volts for each slot to indicate the binary address of that physical slot.

When a slot interrupt occurs, the microprocessor turns off the codec interface interrupt and sets up registers for the bus transfer. Before the bus transfer begins, the microprocessor performs one of two routines, depending on whether voice is currently being transferred. If voice is being transferred, the microprocessor polls the codec interface for receive data available (RDA) or transmit register empty (TRE) flags (shown as flag set in FIG. 5F). These signals are synchronized to occur at the center of the slot. When either condition is satisfied, the voice is transferred. This allows maximum time before the codec interface's FIFO overflows.

If voice is not being transferred, the microprocessor temporarily enables the codec interface and waits for the interrupt to signal the center of the slot (the codec interface being externally synchronized by the timing generator unit). When the center of the slot is indicated, the microprocessor disables the codec interface and waits a fixed period of time (equivalent to the voice transfer time above) before proceeding with the bus transfer.

Since both of the previous routines finish at the same time relative to the beginning of the slot, all boards will consider their bus transfer time to begin at this fixed offset from their respective slot interrupts.

Figure 5E:
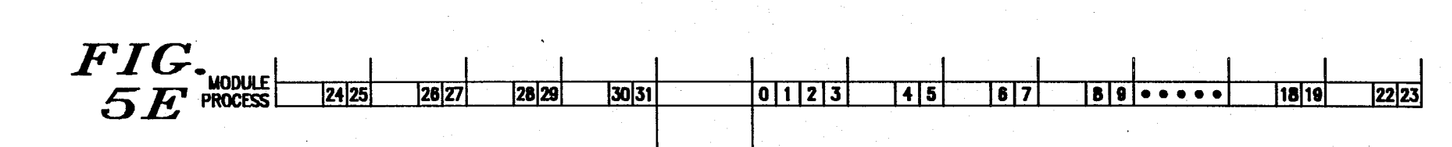
Figure 5F:
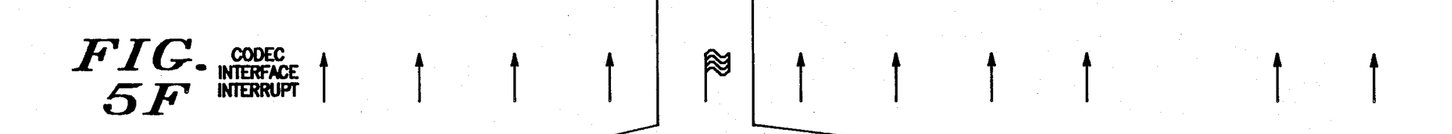
Figure 5G:
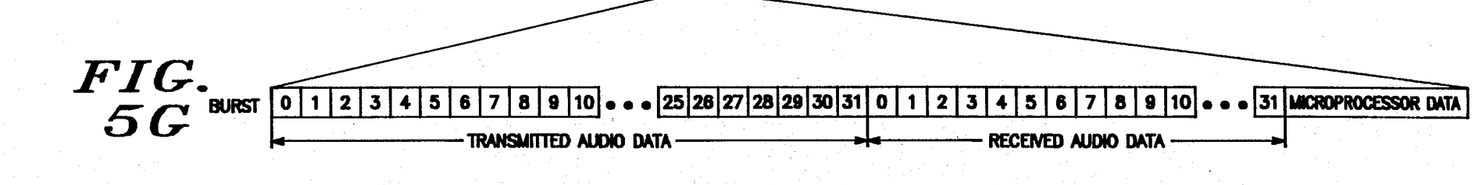

For clarity, an example is given to illustrate access to the bus and the exchange of digital information on the communication bus. FIGS. 5E–G illustrate such an example. For purposes of clarity, assume in FIG. 5E that module 4 is master. Also assume that FIG. 5C is the PCM codec output for analog voice input to module 4. Each time a codec interface interrupt occurs (FIG. 5F), the microprocessor retrieves the data from the FIFO buffer in the codec interface. Note that this occurs independently of activity on the communication bus. Since each module includes an independent processing unit, the module can store information in the module memory when the module is not accessing the bus. Thus, during slots 0–3 and 5–15, module 4 retrieves digitized voice data from the PCM codec. Note also that instead of receiving data, module 4 can also transmit data to the PCM codec to transmit paging information to a pager.

When module 4 becomes master, the module uses its bus access time (shown expanded FIG. 5G) to burst out the data previously collected. Thus, FIG. 5G shows a transmission burst of 32 bytes of data during slot 4 that had been collected during the previous 15 slots Additionally, the master can also receive data from the common memory during this time slot. This is shown as full duplex data and microprocessor data in FIG. 5G. The faster bus rate of the communication bus permit the master to burst out the data previously collected plus any additional data. As will be appreciated, the codec interface FIFO buffer stores an additional two bytes of digitized data when module 4 is master. Thus, during slot 5, the codec interface FIFO buffer holds 4 bytes of data which are retrieved by module 4 during five's slot time period. This insures no loss of data when the module becomes master and transfers data to the shared memory means.

While the above explanation has been used to show the transfer of data from the module to the shared memory means, it will be appreciated that the same technique is used to retrieve digitized voice data from the shared memory means and output it through the PCM codec to the transmitter.

Thus, there has been shown a multiplex bus arrangement for exchanging voice, data, and control information among a plurality of modules. The bus arrangement includes a shared memory means, a timing means, and at least one module. The timing means produces a synchronization signal for effecting a timing operation in the module. The module is responsive to the synchronization signal for establishing a period during which the module is selectively coupled to the bus so that the module may access the memory means. During access, the module can exchange information with the memory means which was collected when the module does not have access to the bus. Additionally, the timing signal of the arrangement are synchronized for effecting an efficient and expeditious exchange of data.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. In a paging terminal, a system for controlling the processing of real time analog voice messages received from an external source said system comprising:
    means for generating a master synchronization signal including a periodic train of sync pulses;
    a bus including a plurality of conductors for carrying digital data in a parallel format, and said master synchronization signal;
    a plurality of processing modules coupled in parallel to said bus, each processing module operative to process real time analog voice messages in parallel with the other processing modules, each processing module including:
    a controller means;
    means operatively synchronized to said master synchronization signal to digitize samples of an analog voice message in real time to generate a stream of digital data samples which together represent a digital data replication of said analog voice message, a predetermined number of samples being digitized in an inter-pulse period of said master synchronization signal;
    a buffer memory for storing said predetermined number of digital data samples; and
    timer means governed by said master synchronization signal to generate an interrupt pulse at a unique time in each inter-pulse period of said master synchronization signal, said controller means responsive to said unique interrupt pulse to transfer within a unique time slot of said inter-pulse period the digital data samples stored in said buffer memory to the parallel digital data conductors of said bus.

2. The system in accordance with claim 1 including means, coupled to the bus, for generating a master clock signal which is provided to the plurality of processing modules over a conductor of the bus; and wherein each processing module includes:
    means governed by the master clock signal to synchronize the digitization of voice message samples with said master clock signal; and
    means governed by the master clock signal to synchronize the generation of the unique interrupt pulse with the master clock signal.

3. The system in accordance with claim 2 wherein the transfer of the digital data samples over the bus during the corresponding unique time slot is performed by the corresponding control means a synchronous to the master clock signal.

4. The system in accordance with claim 1 wherein the control means is operative to substantially unload its buffer memory during its unique time slot of an inter-pulse period of the master synchronization signal so that the buffer memory may be reloaded with another predetermined number of successively digitized data samples and not cause an overflow.

5. The system in accordance with claim 1 including a central memory for storing digital data, said memory coupled to said bus for transferring digital data to and from said bus over said parallel digital data conductors thereof; and wherein the controller means of each processing module is operative to transfer the digital data samples of its buffer memory within its unique time slot of the inter-pulse period of the master synchronization signal to said central memory for storage therein, whereby the central memory stores digital data replications of the voice messages processed by the plurality of processing modules.

6. The system in accordance with claim 5 wherein the controller means of each processing module is further responsive to its unique interrupt pulse to retrieve within its unique time slot of the inter-pulse period of the master synchronization signal a predetermined number of digital data samples of an analog voice message from the central memory over the parallel digital data conductors of the bus and to store said retrieved digital data sample in its buffer memory; and
    the digitizing means of each processing module is further operatively synchronized to the master synchronization signal to decode in real time the digital data samples of its buffer memory to reproduce the analog voice message replicated thereby, a predetermined number of sample being synchronously decoded in an inter-pulse period of the master synchronization signal.

7. The system in accordance with claim 6 wherein each processing module includes means for receiving an analog voice message from a communications medium.

8. The system in accordance with claim 6 wherein each processing module includes means for sending a reproduced analog voice message over a communications medium.

9. The system in accordance with claim 6 including means for encoding a reproduced analog voice message into a page format; and a transmitter coupled to said encoding means for transmitting a page signal including the encoded analog voice message to a paging receiver.

10. The system in accordance with claim 1 wherein the control means of each processing module is responsive to its unique interrupt pulse to transfer within its unique time slot of the inter-pulse period of the master synchronization signal the digital data samples stored in its buffer memory over the parallel digital data conductors of the bus to the buffer memory of another processing module for storage therein; and
    the digitizing means of each processing module is further operatively synchronized to the master synchronization signal to decode in real time the digital data samples of its buffer memory to reproduce the analog voice message replicated thereby, a predetermined number of samples being synchronously decoded in an inter-pulse period of the master synchronization signal.

11. The system in accordance with claim 10 wherein the time delay between digitizing in one processing module and decoding in another processing module of the same predetermined number of digital data samples of an analog voice message is not greater than two inter-pulse periods of the master synchronization signal.

* * * * *